United States Patent [19]
Krouse

[11] Patent Number: 5,227,685
[45] Date of Patent: Jul. 13, 1993

[54] DUAL FUNCTION CORRECTOR FOR BRUSH MOTOR

[75] Inventor: Jeffrey E. Krouse, Carlisle, Pa.

[73] Assignee: General Signal Corporation, Stamford, Conn.

[21] Appl. No.: 760,425

[22] Filed: Sep. 16, 1991

[51] Int. Cl.$^5$ .............. H02K 13/00; H01R 39/36; H01R 39/38
[52] U.S. Cl. .............. 310/71; 310/239; 310/249; 439/926
[58] Field of Search .............. 310/71, 89, 239, 242, 310/249; 439/50, 76, 709, 723, 724, 926, 928

[56] References Cited

U.S. PATENT DOCUMENTS

| | | | |
|---|---|---|---|
| 3,045,137 | 7/1962 | Simmons et al. | 310/239 |
| 3,998,517 | 12/1976 | Griffin | 439/723 |
| 4,613,781 | 9/1986 | Sanders | 310/71 |
| 4,677,333 | 6/1987 | Auzolat et al. | 310/239 |
| 4,851,730 | 7/1989 | Fushiya et al. | 310/249 |
| 4,926,075 | 5/1990 | Fushiya et al. | 310/50 |
| 4,963,779 | 10/1990 | Lentino et al. | 310/71 |
| 4,978,877 | 12/1990 | Quirijnen | 310/239 |
| 5,015,894 | 5/1991 | Crow et al. | 310/71 |
| 5,043,613 | 8/1991 | Kurata et al. | 310/89 |

*Primary Examiner*—Steven L. Stephan
*Assistant Examiner*—D. R. Haszko
*Attorney, Agent, or Firm*—Milton E. Kleinman; Robert R. Hubbard; Robert S. Smith

[57] ABSTRACT

A motor assembly apparatus which includes a housing, an output shaft, a brush assembly, a stator, and a male connector disposed within the housing. The male connector includes a first lug and a second lug and apparatus for connecting the male connectors to the brush assembly and to the stator. In some forms of the invention the male connectors are spade lugs which may be coplanar axially aligned, and the apparatus for connecting the male connectors may include a first planar portion and a second planar portion. The first planar portion is coplanar with the spade lugs in some forms of the invention and the second portion is disposed in oblique relationship to the first portion. The housing may include first and second slots dimensioned and configured and aligned respectively with the first and second spade lugs to allow entry of associated mating electrical connectors.

9 Claims, 2 Drawing Sheets

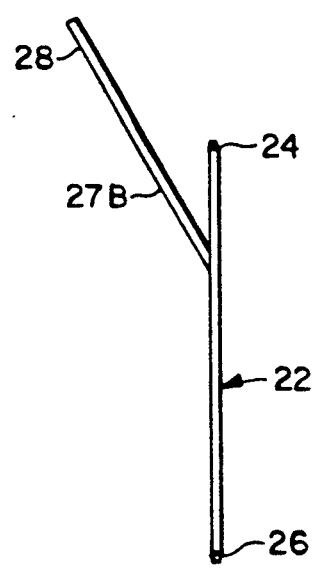
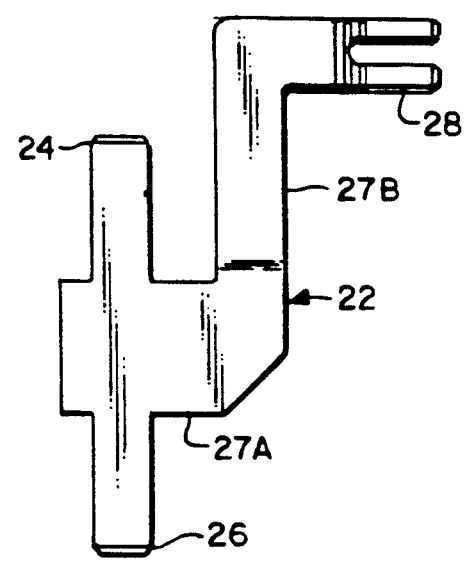
FIG. 3
FIG. 4

DUAL FUNCTION CORRECTOR FOR BRUSH MOTOR

BACKGROUND OF THE INVENTION

The invention relates to electric motors and particularly to apparatus for connection of testing or radio frequency interference (rfi) suppression apparatus to an electric motor.

The prior art includes spade lug connectors that are widely used as electrical connection devices. For example, they are widely used in the automobile industry.

The known spade lugs are not satisfactory, in their basic form, for connecting rfi suppression devices to an electric motor that may be manufactured by a first manufacturer and installed in the product of a second manufacturer. In this example the second manufacturer may supply the rfi suppression device.

The use of even an insulated spade lug on a pigtail is not satisfactory because it is more likely to touch structure at another potential and is more difficult to install quickly. In part the increased difficult results because two hands will be necessary to complete the connection. The same disadvantages also apply where the connection is being made to test equipment.

It is an object of the invention to provide apparatus for connection of test equipment, rfi suppression equipment and the like to a motor.

It is an object of the invention to provide apparatus which is inexpensive to manufacture as well as requires a minimum of labor to install.

Still another object of the invention is to provide apparatus to enable the installer to make the installation at least ordinarily with only one hand.

SUMMARY OF THE INVENTION

It has now been found that these and other objects of the invention may be attained in a motor assembly apparatus which includes a housing, an output shaft, a brush assembly, a stator, and a male connector disposed within the housing. The male connector includes a first lug and a second lug and means for connecting the male connectors to the brush assembly and to the stator.

In some forms of the invention the male connectors are spade lugs which may be coplanar. The spade lugs may be axially aligned and the means for connecting the male connectors may include a first planar portion and a second planar portion. The first planar portion is coplanar with the spade lugs in some forms of the invention and the second portion is disposed in oblique relationship to the first portion.

The housing may include first and second slots dimensioned and configured and aligned respectively with the first and second spade lugs to allow entry of associated mating electrical connectors.

In some forms of the invention the housing includes an upper housing portion and a lower housing portion and the first slot is in the upper housing portion and the second slot is in the lower housing.

BRIEF DESCRIPTION OF THE DRAWING

The invention will be better understood by reference to the accompanying drawing in which:

FIG. 3 is an end elevational view of a part of the connector in accordance with one form of the invention.

FIG. 4 is a side elevational view of the part of the connector shown in FIG. 3.

DESCRIPTION OF THE PREFERRED EMBODIMENT

Figure 1:
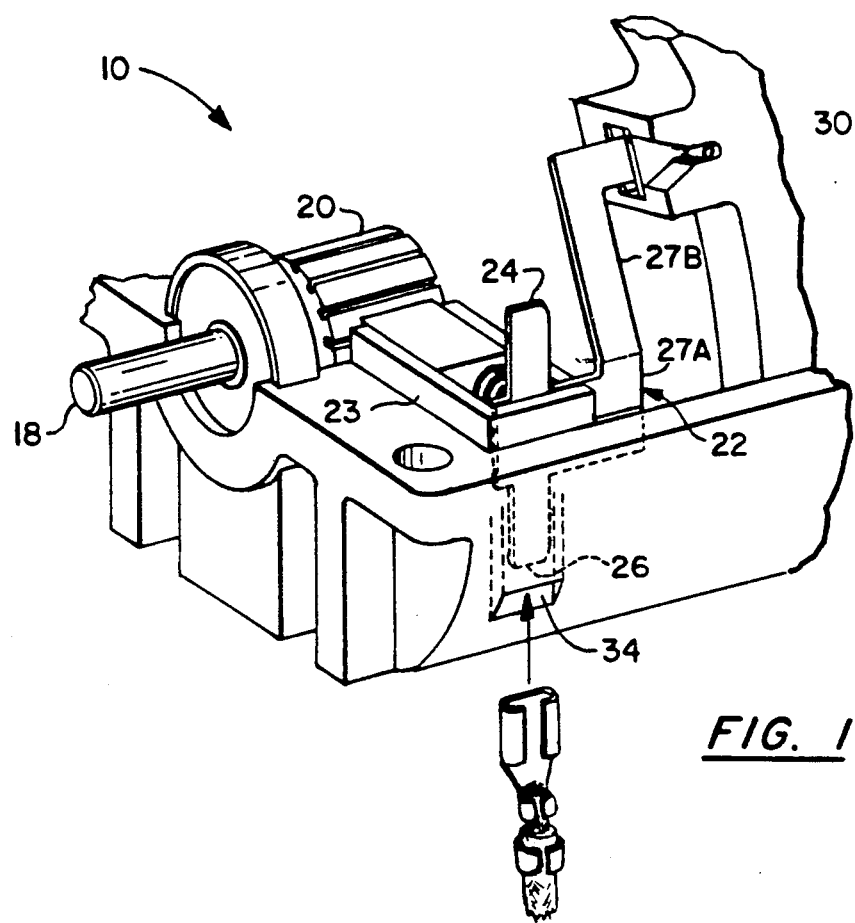
FIG. 1 is a fragmentary partially broken away view of a motor in accordance with one form of the invention.
Figure 2:
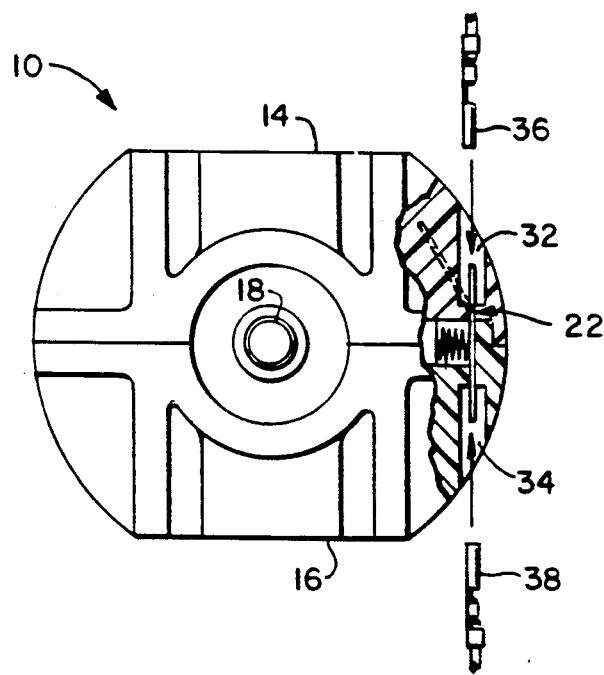
FIG. 2 is an end elevational view partially broken away and partially in section illustrating the connector in greater detail.

Referring now to FIGS. 1-4 there is shown a motor assembly 10 that includes a housing 12 having a upper housing portion 14 and a lower housing portion 16. The upper housing portion 14 is dimensioned and configured to mate with the lower housing portion 16. The motor assembly 10 includes an output shaft 18 and a commutator 20. Cooperating with the commutator 20 is a brush assembly 23 which includes a spring 25 that urges the brush against the commutator 20. The spring 25 bears against a male electrical connector 22 that is held within recesses in upper housing portion 14 and lower housing portion 16.

The male connector 22 includes a first spade lug 24 and a second spade lug 26. It will be seen from the drawing that the first spade lug 24 and second spade lug 26 are each generally planar and are coplanar and axially aligned. The male connector 22 also includes a branch 27 that has a planar portion 27A that is coplanar with the first spade lug 24 and second spade lug 26. This planar portion extends laterally from the coplanar axially aligned first spade lug 24 and second spade lug 26. The branch 27 includes another generally planar portion 27B that extends thereafter in generally oblique relationship to the coplanar first spade lug 24, second spade lug 26 and the planar portion 27A. The free end or axial extremity of the portion 27B includes a commercial stator coil connector 28. More specifically, the commercial stator coil connector 28 connects to a stator coil 30.

The upper housing portion 14 includes an upper slot 32 that is disposed around the first spade lug 24. The upper slot 32 is dimensioned and configured to allow entry of a upper female connector 36 into the upper slot 32 and connection to the first spade lug 24. Similarly the lower housing portion 16 includes a lower slot 34 disposed around the second spade lug 26. More specifically, the lower slot 34 is dimensioned and configured to allow entry of a lower female connector 38 to the second spade lug 26.

In other forms of the invention the precise geometric form of the male connector 22 may vary without departing from the spirit of the invention. Although the described geometric form is particularly desirable to fit within the envelope of a small motor various other forms are within the spirit of the invention. For example, the branch 27 may be disposed within a single plane. Such an arrangement will be most suitable when the motor is relatively large and the envelope requirements are not stringent. Although spade lugs have been shown in the preferred embodiment it will be understood that other forms of the invention other types of electrical connectors may be utilized. Similarly, it is a more compact arrangement to have the first spade lug 24 and second spade lug 26 disposed in axially aligned relationship with one extending within a upper slot 32 in upper housing portion 14 and the other extending into a lower slot 34 in lower housing portion 16. In large motors where or where space is not so critical or for other applications the first spade lug 24 and second spade lug 26 need not be axially aligned. Similarly, the gender of the first spade lug 24 and the second spade lug 26 may be changed in some forms of the invention. In other words one or both may be female in some forms of the invention.

It will thus be seen that the apparatus in accordance with one form of the invention enables easy connection of test equipment rfi suppression equipment and the like to a motor. The connection is inexpensive to manufacture and requires a minimum of labor to install. An installer is usually able to make the installation with only one hand.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. A motor assembly apparatus which comprises:
   a housing;
   an output shaft mounted within said housing for rotation, said shaft having an axis;
   a brush assembly;
   a stator;
   a male connector disposed within said housing, said male connector including a first spade lug and a second spade lug, said first and second spade lugs being coplanar and coaxial;
   means for connecting said male connector to said brush assembly and to said stator, said means for connecting said male connector includes a first planar portion and a second planar portion,
   said first planar portion being coplanar with said spade lugs and said second planar portion being disposed in oblique relationship to said first planar portion.

2. The apparatus as described in claim 1 wherein:
   said housing includes first and second slots dimensioned and configured and aligned respectively with said first and second spade lugs to allow entry of associated mating electrical connectors.

3. The apparatus as described in claim 2 wherein:
   said housing includes an upper housing portion and a lower housing portion, said upper and lower housing portions mating substantially at a plane that is generally parallel to said axis.

4. The apparatus as described in claim 3 wherein:
   said first slot is in said upper housing portion.

5. The apparatus as described in claim 4 further including:
   said second slot is in said lower housing portion.

6. A motor assembly apparatus which comprises:
   a housing;
   an output shaft mounted within said housing for rotation, said shaft having an axis;
   a brush assembly;
   a stator;
   a male connector disposed within said housing, said male connector including a first lug and a second lug;
   means for connecting said male connector to said brush assembly and to said stator, said housing includes first and second slots dimensioned and configured and aligned respectively with said first and second lugs to allow entry of associated mating electrical connectors, said housing includes an upper housing portion and a lower housing portion, said upper housing portion and said lower housing portions mating substantially at a plane, said plane extending parallel to said axis, said first slot being disposed in said upper housing portion, said second slot being disposed in said lower housing portion, said first and second slots being disposed in substantially coaxial relationship.

7. Apparatus as described in claim 6 wherein:
   said plane substantially axially bisects said housing.

8. A motor assembly apparatus which comprises:
   a housing;
   an output shaft mounted within said housing for rotation, said shaft having an axis;
   a brush assembly;
   a stator;
   a male connector disposed within said housing, said male connector including a first lug and a second lug;
   means for connecting said male connector to said brush assembly and to said stator, said housing including first and second slots dimensioned and configured and aligned respectively with said first and second lugs to allow entry of associated mating electrical connectors,
   said housing including an upper housing portion and a lower housing portion, said upper housing portion and said lower housing portions mating substantially at a plane, said plane extending generally parallel to said axis, said first slot being disposed in said upper housing portion and said second slot being disposed in said lower housing portion.

9. The apparatus as described in claim 8 wherein:
   said plane substantially axially bisects said housing.

* * * * *